United States Patent Office 3,453,845
Patented July 8, 1969

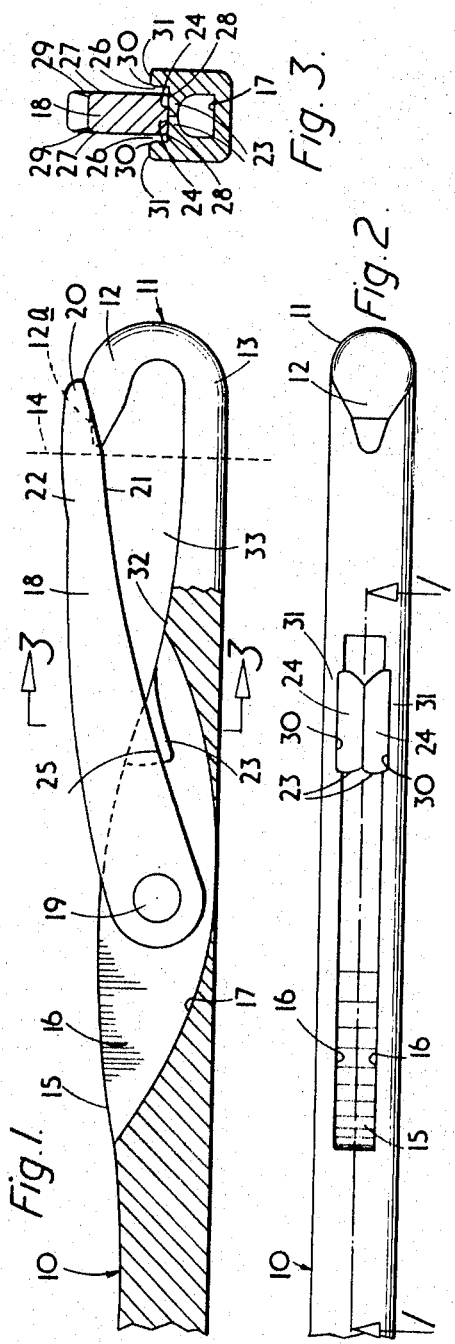

3,453,845
LATCHED NEEDLES
John K. Blackwell, Helensburgh, Scotland, assignor to Redditch Hosiery Needles Limited, Birmingham, England, a British company
Filed July 14, 1967, Ser. No. 653,362
Claims priority, application Great Britain, Nov. 8, 1966, 49,958/66
Int. Cl. D04b 35/04, A44b 13/00
U.S. Cl. 66—121                                      3 Claims

ABSTRACT OF THE DISCLOSURE

A latched needle having a shank including a shank portion proper and a hook portion at the forward end thereof; a pivotal latch element disposed with an end portion in a slot in the shank portion and movable angularly about its pivot in a plane containing both the shank portion and the hook portion between a closed position, in which its free end is in contact with the extremity of the hook portion and closes the mouth afforded by the hook portion, and an open position, which its free end is spaced from the extremity of the hook portion, a stop face on at least one projection extending laterally into the slot in the shank portion to engage a stop face on the latch element concurrently with engagement of the free end portion thereof with the extremity of the hook portion, thereby partly relieving contact pressure between the hook portion and the latch element.

BACKGROUND OF THE INVENTION

Field of the invention

This invention relates to needles of the kind comprising a shank including a shank portion proper and a hook portion at the forward end thereof, and a latch element pivotally mounted in a slot formed in the shank portion and movable about the axis of the pivot between a closed position in which it spans and closes the mouth of the hook portion, and an open position in which it extends rearwardly from said pivotal axis. Such needles are herein referred to as being latched needles of the kind specified.

Latched needles of the kind specified are used inter alia in knitting machines for knitting hosiery and other knitted products.

Description of the prior art

The free end of the latch element and the free end of the hook portion are ordinarily formed to penetrate each other to some extent, one of these parts, usually the latch element, being formed with a recess into which the other of the parts extends, the sides of the recess providing a means whereby latch element is located or restrained from lateral displacement (additionally to restraint arising from engagement of the latch element of the side faces of the slot in which it is pivoted). In the closed position the inner edge face of the latch element at its free end is seated against the outer edge face of the hook portion at its free end, one of these two faces incorporating a recess (usually that of the latch element which is thus of spoon shape at its free end), and the other of the faces being of rounded convex form as viewed in transverse cross-section to mate with a correspondingly curved concave face presented by the recess.

In conventional latched needles of the kind specified, it is known that instead of moving into their closed positions and being properly retained in such closed positions by the locating faces hereinbefore described, the latch elements do sometimes move angularly beyond the closed position causing the free end portions of the latch elements to become trapped beneath the inner edge face of the hook portion and lie within the aperture of the hooked portion. This malfunctioning is more prone to occur for very small sized latched needles of the kind specified, wherein the width of the hook portion and adjacent part of the shank portion and the width of the latch element are small, for example, of the order of 0.010 inch in the case of said shank portion with corresponding dimensions for the other portions of the needle. This malfunctioning is not confined to such small sized needles.

When such malfunctioning occurs the knitted product produced in the knitting machine is defective since stitches can no longer move rearwardly from the eye defined by the latch element, hook portion, and adjacent part of the shank portion along the rearward part of the shank portion during operation of the machine because the opening of the latch element ordinarily produced by the rearward thrust of the stitch in the eye is not sufficient to release the latch element from its trapped relation beneath the inner edge face of the hook portion.

Further, where a latched needle of the kind specified, incorporates the normal recess in the inner edge face of the latch element adjacent to its free end, that is to say the spoon shaped part, it has been found that after a period of service, sharp edges tend to be formed at the junction of the side faces of the recess and the lateral margins of the inner edge faces of the spoon-shaped part of the latch element which lie laterally outwardly of the recess.

When the latch element is in its open position in which it extends rearwardly of its pivotal axis and ordinarily makes an acute included angle with the rearward part of the shank portion, these sharp edges are presented outwardly and come into contact with the stitch as it moves from the then open eye of the needle onto the rearward part of the shank portion passing over the latch element in doing so. As a result of this the yarn of which the stitch is formed can be damaged by cutting and in extreme cases the yarn can be completely severed. The former condition produces a weakened product and the defect may not be revealed by subsequent inspection, whilst in the latter case the product of course is waste.

Wear on the hook portion can also be pronounced especially where needles are required to operate at high speeds and/or are utilised for the knitting of fabrics of elastic yarn, the latter causing increased pressure to be established between the latch element and the hook portion.

One of the objects of the invention is to provide a new or improved form of latched needle whereby this disadvantageous effect can be avoided or its occurrence reduced.

SUMMARY OF THE INVENTION

According to the invention a latched needle comprises a shank including a hook portion at the forward end of the shank having a free end, and a shank portion proper having a slot therein lying in a plane containing the shank and hook portions. A latch element has an end portion thereof disposed in the slot, and pivot means connects the end portion of the latch element to the shank portion for angular movement in this plane between open and closed positions. Stop means limits this angular movement at its closed position and defines the same, which stop means includes a contact face on the hook portion adjacent the free end thereof and a contact face at the free end of the latch element engaging the contact face of the hook portion when the latch element is in its closed position. One of the contact faces is of recessed form and the other engaging therein to contribute to lateral location of the latch element. The stop means also includes at least one projection in the slot in the shank portion, extending laterally inwardly towards a median plane of the slot and having a stop face thereon. A stop face on the end portion of the latch element engages the stop face in the slot when the latch element is in its closed position.

Since the load imposed on the contacting faces of the latch element and hook portion at their free ends, in arresting closure movement of the latch element, is appreciably reduced by virtue of the fact that part of this load is now borne by the additional stop face, the wear on the hook portion and any deepening of the recess, is minimised. The setting up of sharp edges on the latch, when this incorporates the recess, is also either eliminated or occurs only after a very much longer period of service.

BRIEF DESCRIPTION OF DRAWINGS

The invention will now be described by way of example, with reference to the accompanying drawings, wherein:

FIGURE 1 is a view in side elevation and partly in cross-section on the line 1—1 of FIGURE 2 showing the leading end of one embodiment of latched needle of the kind specified in accordance with the invention;

FIGURE 2 is a plan view of the same embodiment omitting the latch; and

FIGURE 3 is a view in cross-section on the line 3—3 of FIGURE 1.

DESCRIPTION OF THE PREFERRED EMBODIMENT

Referring to the embodiment illustrated in FIGURES 1 to 3, the needle comprises a shank including a shank portion proper 10 and a hook portion 11 which incorporates two limbs 12 and 13 of which the latter is integrally connected to the shank portion. For convenience in the following description and avoidance of doubt, it is assumed that the limb 13 of the hook portion is of the same length as the limb 12 and that the shank portion 10 of the needle extends to the broken line 14.

The shank portion 10 of the needle is of rectangular shape in cross-section, whilst the limb 13 of the hook portion is of approximately circular or oval cross-section merging smoothly with the shank portion in the region of the line 14. The limb 12 is also of circular or oval cross-section and, as seen in plan in FIGURE 2, diminishes in diameter or average diameter towards its free end.

The shank portion 10 is formed with a slot 15 having side faces 16 which are parallel to each other and parallel to a reference median plane of the shank portion and equi-distant from the latter.

The slot 15 is conveniently formed by a circular saw and the base 17 of the slot is thus of circular form in profile.

The needle further comprises a latch element 18 which is pivotally mounted in the slot 15 by means of a pivot element 19 extending into a correspondingly shaped aperture in the latch element. Whilst the latch element 18 is of generally rectangular shape for most of its length with rounded corners, its free end 20 is widened and the inner edge face 21 at this position incorporates a recess so that the portion 20 is generally of spoon shape and is herein called the spoon portion of the latch element.

The recess presented by the spoon portion has a concave curvature in transverse cross-section which matches the convex curvature presented by that portion 12a of the limb 12 which is received in this recess, the depth of the recess presented by the spoon portion typically being about one fifth of the total dimension between the inner and outer edge faces 21 and 22 of the spoon portion 20 of the latch element.

The outer face of the limb 12 of the hook portion and the face of the spoon-shaped recess form contact faces which engage each other in the closed position of the latch element and act as part of the stop means which arrests the latch element when moving from its open position to its closed position, as seen in FIGURE 1.

In order to relieve the pressure established between these contact faces, the stop means further includes an additional stop face, herein called a stop face, provided on the shank portion of the needle to engage a portion of the inwardly presented edge face of the latch element intermediate the pivot element 19 and the spoon portion 20, such portion constituting a stop face on the latch element.

For this purpose, at least one, and preferably two projections 23 are formed at the side faces 16 of the slot 15. These projections 23 collectively form a shelf and their outwardly presented faces 24 together constitute the stop face which engages an opposed part 25 of the inner edge face 21 of the latch element 18.

The projections 23 are preferably formed by displacing material of the shank portion of the needle downwardly towards the base 17 of the slot and also inwardly towards the median plane by means of a suitable pressing tool whilst the shank portion is supported in a die. The outwardly presented faces of the projections 23 lie below the level of the margins of the edge face of the shank portion which border the mouth of the slot.

In consequence of the formation of the projections 23 from material formerly embodied in the limbs on each side of the slot, the part of the slot adjacent to its mouth is widened and clearance spaces 26 are formed between the side faces 16 of the slot and the opposed outwardly presented side faces 27 of the latch element 18.

Not only do the stop faces prevent movement of the latch element beyond the closed position and thereby avoid the spoon portion becoming trapped beneath the limb 12, such as can occur when there is lateral play or looseness at the pivot element 19, but also the forces required to arrest the latch element at its closed position are borne on the faces 24, thereby relieving the recessed face of the spoon portion and the convex face of the limb 12 of part of this load.

Consequently there is less tendency for the recess to become deepened and there is less tendency for the sharp corners to be formed at the junction of the side faces of the recess of the spoon portion 20 and the lateral margins of the edge face 21 which lie laterally outwardly of the recess.

Consequently when the latch is in an open position extending rearwardly from the pivot element 19, the possibility of the yarn being cut or severed in passing over the then outwardly presented edge face 21 is very materially reduced.

Moreover the presence of the clearance spaces 26 avoids or minimises the risk of yarn being cut or sheared during closure of the latch element when a loop of yarn is engaged about that part of the shank portion at which the projections 23 are formed. It will be noted that the lower corners 28, as well as the upper corners 29, of the latch element are rounded and this rounding of the lower corners 28 extends the clearance space 26 inwardly at the time at which these corners are coplanar with the mouth of the slot.

The inner corner 30 formed at the junctions of the side faces 16 and lateral margins 31 of the edge face 32 of the shank portion may also be rounded at a position between the pivot element 19 and the rearward end of the eye 33 of the needle. If desired the projections 23, instead of terminating at the rearward end of the eye 33 as shown, may be extended forwardly so as to continue the clearance spaces 26 in this region. It will be understood that, due to dimensional tolerances in production, there may be some variation as to the angular relationship between the edge faces 21 and 32 in the closed position of the latch element and the forward extension of the projections 23 and clearance spaces 26 is a safeguard against cutting or shearing of the yarn in the final stage of closure of the latch element.

It will be appreciated that if contact should be established between one pair of contacting faces, for example the recessed face of the spoon portion 20 and the convex face of the limp 12, before contact is established between the stop face 24 and the opposed part of the inner face 25, the whole of the load involved in arresting the latch would for a time be borne by the faces in contact, and after only a short period of service the resultant wear or bedding down would allow sufficient further movement of the latch element to take place to establish contact at both pairs of contacting faces.

It will be understood that the needle may be made of any suitable materials heretofore employed for that purpose, such as steel.

I claim:
1. A latched needle comprising:
 (a) a shank including a hook portion at the forward end of said shank having a free end, and a shank portion proper having a slot therein lying in a plane containing both said shank portion and said hook portion,
 (b) a latch element having an end portion thereof disposed in said slot and a free end remote from said end portion;
 (c) pivot means connecting said end portion of said latch element to said shank portion for angular movement in said plane between open and closed positions, and
 (d) stop means for limiting said angular movement of said latch element at its closed position and defining said closed position, including:
  (i) a contact face on said hook portion adjacent said free end thereof and a contact face at said free end of said latch element engaging said contact face of said hook portion when said latch element is in the closed position thereof, one of said contact faces being of recessed form and the other contact face engaging in said one contact face to contribute to lateral location of said latch element, and
  (ii) at least one projection in said slot extending laterally inwardly towards a median plane of said slot and having a stop face thereon, and a stop face on said end portion of said latch element engaging said stop face in said slot when said latch element is in the closed position thereof.

2. A latched needle according to claim 1, wherein said stop face on said projection lies within said slot below the level of marginal faces on said shank portion laterally bordering said slot at its mouth from which said latch element extends.

3. A latched needle according to claim 1, wherein:
 (a) said projection comprises a part of shank portion permanently deformed into laterally inwardly displaced relation to an adjacent side wall of said slot,
 (b) said part is situated at a position between a bottom wall of said slot and a mouth thereof from which said latch elements extends.

References Cited
UNITED STATES PATENTS 2,699,053  1/1955  Noe _____ 66—121
3,164,000  1/1965  Ashe _____ 66—121

RONALD FELDBAUM, *Primary Examiner.*

U.S. Cl. X.R.

24—232